United States Patent Office 3,490,927
Patented Jan. 20, 1970

3,490,927
$Nb_2O_5$ AND $Ta_2O_5$ DOPED $BaTiO_3$ CERAMIC BODY AND PROCESS THEREFOR
Manfred Kahn and Maggio P. Pechini, Williamstown, Mass., assignors to Sprague Electric Company, North Adams, Mass., a corporation of Massachusetts
No Drawing. Filed Aug. 1, 1966, Ser. No. 569,088
Int. Cl. C04b 35/46, 33/00
U.S. Cl. 106—39        8 Claims

ABSTRACT OF THE DISCLOSURE

The process for coating the particle surface of a powdered titanate involves hydrolyzing a niobium or tantalum alkoxide of a high boiling polyhydroxy alcohol in the presence of a powdered titanate in an aqueous solution of a high boiling polyhydroxy alcohol. A ceramic body formed from the niobium pentoxide or tantalum pentoxide coated powder will contain from 0.2 to 0.4% by weight of either said niobium pentoxide or said tantalum pentoxide and will have crystallites of about 1 micron in size and be distinguished by the absence of any abnormal or large inclusions of a second phase.

---

This invention relates to a process for forming a powdered composition, a ceramic body and more particularly a ceramic titanate body and the process for forming the same.

It is desirable for various reasons, to incorporate certain additives into the unfired inorganic material which is to be fired to a mature ceramic. For example, the optimum dielectric constant for barium titanate is achieved when the grain size is about 1 micron in diameter. On either side of 1 micron, the dielectric constant decreases. As far as the nonlinear characteristics are concerned (i.e. the charge on the capacitor is not linearly proportional to the applied voltage) they are attenuated as grain size is decreased and as grain size increases the characteristics become more nonlinear. One way in which to control these and other characteristics of a ceramic body is by the addition of certain additives.

It is an object of the present invention to provide a method for incorporation of very small proportions of additives into a ceramic body in a uniform and evenly distributed manner.

It is another object of this invention to provide a method for incorporating very small proportions of additives into granular material in a uniform and evenly distributed manner.

It is still another object of the present invention to form a coated powder material.

It is yet another object of the present invention to form a ceramic titanate body having improved characteristics.

A still further object is to present a new process for inhibiting grain growth in a barium titanate ceramic.

Yet another object is to present a novel ceramic body.

Other objects and advantages of the present invention will be made obvious to those skilled in the art by the following description.

In accordance with the present invention a ceramic titanate body is formed by coating the particle surface of a material consisting essentially of a powdered titanate, with a fine layer of a member selected from the group consisting of niobium pentoxide and tantalum pentoxide.

This coating is accomplished by hydrolysis of an Nb or Ta alkoxide in an aqueous slurry of said titanate powder. The coated powder is separated by filtration and dried. Thereafter, the coated powder is formed into a coherent body and fired to maturity.

In this process the additive oxide, in the form of the hydrated oxide, is quantitatively and homogeneously generated in the milling medium containing the titanate particles in suspension. The hydrolysis process, generating the additive oxide, is initially delayed by employing as the milling medium a solution comprised of the Nb or Ta alkoxide of a polyhydroxy alcohol, dissolved in an aqueous solution of a high boiling polyhydroxy alcohol. This delay permits dispersion of the titanate particles throughout the initially stable milling medium. The water in the aqueous solution can range from about 10–80%, for instance 50%. By solvation action the titanate particles form basic sites which initiate the hydrolysis reaction and form preferred deposition regions. The milling is continued until the deposition of the metal oxide is complete.

The following example illustrates the process of the invention.

EXAMPLE

Niobium pentaethoxide is added to ethylene glycol and heated to form the alkoxide, $Nb_2[O(CH_2)_2O]_5$, in excess ethylene glycol. This product is diluted with anhydrous methanol to yield a 200 ml. solution, containing the equivalent of 0.03 gm. $Nb_2O_5$/ml.

A mixing mill was prepared containing 25% $H_2O$, 25% ethylene glycol, 12% of a high purity $BaTiO_3$ powder having a particle size of about 1 micron and 38% of milling balls. An amount of the above alkoxide solution, sufficient to yield 0.2–0.4% $Nb_2O_5$ in the $BaTiO_3$ composition, is added to the milling medium and the medium is milled for a period of 24 hours. The resulting slurry is filtered, dried and baked to remove $H_2O$ and residual organic material. This material is pulverized and a paraffin binder added thereto. The mixture is formed into a plurality of discs and compacted by 8000 p.s.i. These discs were then gradually fired to maturity above 2350° F.

The ceramic discs so formed have a grain size of approximately 1 micron. This indicates the grain growth inhibiting effectiveness of the $Nb_2O_5$, introduced by the process of the present invention. The dielectric constant of the units averaged about 3900. The ceramic discs formed by the foregoing process are distinguished by the absence of any abnormal or large inclusions of a second phase. The dielectric constant of these units did not vary, on the average, more than −30% and +12.5% over the temperature range of −55° C. to 85° C. Tantalum may be substituted for niobium in the foregoing example.

By way of comparison, when 1 micron size $Nb_2O_5$ is water slurry milled into 1 micron size barium titanate the final cermaic bodies have a poor microstructure. The nobium pentoxide is in the form of relatively large grains which are not uniformly distributed. As a consequence of the uneven distribution, grain growth is only inhibited in localized areas, resulting in large grains which may be conductive.

In order to mix a small percentage of granular impurity evenly into a granular matrix, the size of the impurity would have to be smaller than the sizes of the matrix by a factor which is proportional to the impurity concentration. For instance in order to mix 1% of granular $Nb_2O_5$ evenly into a $1\mu$ $BaTiO_3$ matrix the $Nb_2O_5$ would have to be smaller than .01$\mu$. Prior to this invention $Nb_2O_5$ was not available in this size.

While the specific example employed a mixing mill to effect intimate mixing and hydrolysis, it is to be understood that other means of effecting intimate mixing can be employed.

In addition to barium titanate, other titanate material can be employed in the present process e.g. the alkaline earth titanates, lead titanate, stannous titanate, zirconium titanate, etc., and mixtures thereof.

It is believed that the titanates in general can be considered as the reaction product of a strongly basic metal oxide (MO) and a weakly acidic oxide ($TiO_2$). When these titanates are dispersed in water as particles, they tend to form basic sites by removing $H^+$ ions from the water: $y(MTiO_3 \cdot xH_3O^+)x(OH^-)$. When dispersed in an aqueous solution of the hydrolyzable metal alkoxide used in the present invention, the basic sites will form preferred nucleating regions for the liberated metal oxide, due to the availability of $OH^-$ ions.

While the specific example shows the use of barium titanate of 1 micron particle size it is to be understood that the titanate particle size can preferably range from 0.1 to about 5 microns and yet for certain purposes extend to 30 microns.

The starting material for the subject process is a niobium or tantalum alkoxide obtained from a high boiling (i.e. over 100° C.) polyhydroxy alcohol. Representative of the polyhydroxy alcohols are: ethylene glycol, propylene glycol, trimethylene glycol, glycerol, etc. The preferred high boiling alcohol is ethylene glycol. The precentage of the metal oxide incorporated into the composition by the process of the present invention will generally depend upon the particular characteristic desired to be modified or controlled. Normally it will fall within the range of about 0.01% to 10%. For barium titanate of 1 micron size, where grain growth inhibition is the end desired, the optimum percentage range of $Nb_2O_5$ is from 0.2–0.4%. The firing temperature for the process of the present invention can range between 2350–2700° F. The preferred temperature is about 2500° C.

What is claimed is:

1. A process for forming a coated powder comprising coating the particle surface of a powdered titanate with a fine layer of a material selected from the group consisting of niobium pentoxide and tantalum pentoxide; said oxide being hydrolysis generated and said coating being accomplished by milling (I) a niobium or tantalum alkoxide of a high boiling polyhydroxy alcohol with (II) a slurry of said powdered titanate in an aqueous solution of a high boiling polyhydroxy alcohol so as to effect a delayed hydrolysis by presenting a dispersion of titanate particles throughout the initially stable mixture; after said hydrolysis is substantially complete, separating the oxide-coated powdered titanate from the liquid phase.

2. The process of claim 1 wherein the coated powder is compacted into at least one shaped body and fired to maturity.

3. The process of claim 2 wherein the titanate powder is barium titanate; the high boiling alcohol boils above 100° C.; and said coating oxide is present in an amount of from 0.01 to 10% by weight of said ceramic body.

4. The process of claim 3 wherein the coating oxide is tantalum oxide, and the high boiling alcohol is ethylene glycol.

5. The process of claim 3 wherein the coating oxide is niobium oxide and the high boiling alcohol is ethylene glycol.

6. The process of claim 5 wherein the niobium oxide is present in from 0.2–0.4% by weight.

7. A ceramic body consisting of barium titanate containing niobium oxide equivalent to 0.2 to 0.4% by weight niobium pentoxide which ceramic body has uniform and controlled crystallites of about one micron in size and being distinguished by the absence of any abnormal or large inclusions of a second phase said ceramic body having a minimum dielectric constant of 3000.

8. The ceramic body of claim 7 wherein said dielectric constant does not vary more than −30% to +12.5% over the range of −55° C. to 85° C.

References Cited

UNITED STATES PATENTS

| | | | |
|---|---|---|---|
| 2,742,370 | 4/1956 | Wainer | 106—39 |
| 2,780,558 | 2/1957 | Wilcox | 117—100 X |
| 3,080,239 | 3/1963 | Zlotnick | 106—39 |
| 3,146,119 | 8/1964 | Ritter | 106—308 X |
| 3,244,639 | 4/1966 | Mindick | 106—308 X |
| 3,274,467 | 9/1966 | Graf | 106—39 X |
| 3,330,697 | 7/1967 | Pechini | 106—39 X |

FOREIGN PATENTS 755,860   8/1956   Great Britain.

OTHER REFERENCES

Cotton, F. A.: Progress in Inorganic Chemistry, vol. II, New York, Interscience Publ., 1960, pp. 314–315.

Heynang, W.: J. Amer. Cer. Soc. 47, October 1964, pp. 484–490.

HELEN M. McCARTHY, Primary Examiner

W. R. SATTERFIELD, Assistant Examiner

U.S. Cl. X.R.

23—22; 117—100; 252—63.5

UNITED STATES PATENT OFFICE
CERTIFICATE OF CORRECTION

Patent No. 3,490,927    Dated January 20, 1970

Inventor(s)  Manfred Kahn and Maggio P. Pechini

It is certified that error appears in the above-identified patent and that said Letters Patent are hereby corrected as shown below:

Column 1, line 2, change "$BaT_1O_3$" to -- $BaTiO_3$ --
Column 2, line 52, change "cermaic" to -- ceramic --
Column 2, line 60, change "sizes" to -- size --
Column 4, line 21, change "to" to -- and --

SIGNED AND
SEALED

JUL 7 1970

(SEAL)
Attest:

Edward M. Fletcher, Jr.
Attesting Officer

WILLIAM E. SCHUYLER, JR.
Commissioner of Patents